United States Patent
Temple et al.

(10) Patent No.: US 6,511,611 B2
(45) Date of Patent: Jan. 28, 2003

(54) COMPOSITIONS FOR REDUCING TRUE COLOR IN WASTE LIQUIDS

(75) Inventors: Stephen R. Temple, Santa Cruz, CA (US); Michael J. Stoltz, Altoona, PA (US)

(73) Assignee: Steen Research, LLC, West Linn, OR (US)

( * ) Notice: Subject to any disclaimer, the term of this patent is extended or adjusted under 35 U.S.C. 154(b) by 0 days.

(21) Appl. No.: 10/095,900

(22) Filed: Mar. 11, 2002

(65) Prior Publication Data

US 2002/0130089 A1 Sep. 19, 2002

Related U.S. Application Data

(60) Division of application No. 09/715,792, filed on Nov. 17, 2000, which is a continuation-in-part of application No. 09/501,346, filed on Feb. 9, 2000.
(60) Provisional application No. 60/119,886, filed on Feb. 12, 1999.

(51) Int. Cl.[7] .................................................. C02F 1/56
(52) U.S. Cl. ........................ 252/181; 210/728; 210/917; 210/928; 162/189; 524/922
(58) Field of Search ................................ 210/705, 725, 210/727, 728, 735, 736, 917, 928; 252/180, 181; 162/189, 190; 524/922

(56) References Cited

U.S. PATENT DOCUMENTS

| | | | |
|---|---|---|---|
| 3,372,129 A | 3/1968 | Phillips | 210/736 |
| 3,738,945 A | 6/1973 | Panzer et al. | 210/736 |
| 3,755,159 A | 8/1973 | Nagy et al. | 210/736 |
| 3,894,944 A | 7/1975 | Panzer et al. | 210/736 |
| 3,894,947 A | 7/1975 | Panzer et al. | 210/736 |
| 3,953,330 A * | 4/1976 | Tonkyn et al. | 210/728 |
| RE28,807 E | 5/1976 | Panzer et al. | 210/736 |
| RE28,808 E | 5/1976 | Panzer et al. | 210/736 |
| 3,975,347 A | 8/1976 | Phillips et al. | 528/405 |
| 4,089,780 A * | 5/1978 | Svarz et al. | 162/16 |
| 4,112,768 A | 9/1978 | Holland et al. | 210/106 |
| 4,693,815 A | 9/1987 | Collins, Jr. | 210/107 |
| 4,800,039 A * | 1/1989 | Hassick et al. | 210/723 |
| 4,956,102 A | 9/1990 | Allsing | 210/784 |
| 5,143,630 A | 9/1992 | Rolchigo | 210/780 |
| 5,200,089 A | 4/1993 | Siefert et al. | 210/725 |
| 5,292,793 A | 3/1994 | Ramesh et al. | 524/555 |
| 5,314,627 A | 5/1994 | Ramesh et al. | 210/734 |
| 5,326,479 A | 7/1994 | Sarkar et al. | 210/719 |
| 5,435,921 A | 7/1995 | Collins et al. | 210/727 |
| 5,435,922 A | 7/1995 | Ramesh et al. | 210/734 |
| 5,578,213 A | 11/1996 | Miller et al. | 210/641 |
| 5,611,934 A * | 3/1997 | Shepperd et al. | 210/719 |
| 5,639,379 A * | 6/1997 | Stogner | 210/727 |
| 5,961,838 A * | 10/1999 | Braden et al. | 210/728 |
| 6,023,065 A | 2/2000 | Garver, Jr. | 250/372 |
| 6,120,690 A * | 9/2000 | Haase | 210/728 |
| 6,306,308 B1 * | 10/2001 | Hassick et al. | 210/716 |

* cited by examiner

Primary Examiner—Peter A. Hruskoci
(74) Attorney, Agent, or Firm—Beyer Weaver & Thomas, LLP

(57) ABSTRACT

Compositions of aluminum chlorohydrate and high molecular weight branched epichlorohydrin amine condensate polymers are applied to waste liquids, such as pulp and paper mill effluents having a lignin content, to reduce true color, The branched epichlorohydrin amine condensate polymer is branched using branching agents which result in a molecular weight greater than about 300,000 and permit solubility. When applied to waste liquids, the high molecular weight branched epichlorohydrin amine condensate polymer and aluminum chlorohydrate react with the lignin components in the waste liquid to form an insoluble agglomerate thus reducing the true color of the waste liquid. The resulting agglomerate, including the colored lignin, may be filtered from the waste liquid.

11 Claims, 5 Drawing Sheets

COMPOSITIONS FOR REDUCING TRUE COLOR IN WASTE LIQUIDS

CROSS-REFERENCES TO RELATED APPLICATIONS

This is a Divisional application of co-pending prior Application No. 09/715,795 filed on Nov. 17, 2000, which is a CIP of 09/501,346 filed on Feb. 9, 2000, which claims benefit of 60/119, 886 filed Feb. 12, 1999, the disclosures of which are incorporated herein by reference.

FIELD OF THE INVENTION

The current invention pertains to compositions and processes for reducing true color in waste liquids such as pulp and paper mill effluents. More specifically, the present invention relates to the use of aluminum chlorohydrate polymer blends for the removal of color in pulp and paper mill effluents.

BACKGROUND OF THE INVENTION

Chemical pulping is a preferred method for producing very pure cellulose fibers in paper manufacturing. The most common form of chemical pulping is the Kraft pulping process where materials, such as wood chips, are heated under pressure with an aqueous solution of sodium hydroxide, sodium carbonate, and sodium sulfide (i.e., pulping liquor) to provide a dark brown pulp.

Wood consists of approximately 45% cellulose, 30% hemi-cellulose, 23% lignins and 2% of a mixture of terpenes, resins and fatty acids. Pulping purifies the cellulose and hemi-cellulose from the other components of wood, such as lignins, oils and resins, and is integral to paper manufacturing. Lignins, which are polymers that bind to hemi-cellulose and provide structural rigidity to wood, are degraded by the heated, pressurized caustic solution, resulting in a dark brown pulp substantially enriched in both cellulose and hemi-cellulose.

The Kraft pulping process typically removes about 90 to 95% of the lignin found in naturally occurring wood. The dark brown pulp resulting from the Kraft pulping process may be further refined and bleached to remove the remaining lignin prior to its use in the manufacture of fine paper. Further purification of the pulp requires removal of volatile materials such as terpenes and used pulping liquors, as well as lignins and organic material. Those materials that are not recovered for reuse during the pulping and bleaching processes are then passed as waste effluent to a waste treatment facility prior to discharge into a public sewer system or waterway.

Generally, during the pulping process, wood chips are heated under pressure in a digester with what is referred to as "white liquor," for example, an aqueous solution of sodium hydroxide, sodium carbonate, and sodium sulfide, to provide the dark brown pulp. The used pulping liquor from the digester and this process is referred to as "weak black liquor" and typically contains large amounts of organic materials.

The weak black liquor is typically evaporated in evaporators or multiple effect evaporators to provide a strong black liquor that contains over 50% solids. This highly concentrated solution of lignin, dissolved organic material and pulping liquor additives is then burned in a liquor recovery boiler. The organic material and the lignins are combusted while the pulping liquor additives may be recovered for reuse, e.g., recovery boiler effluent.

The pulp resulting from the Kraft process is then bleached, typically using chlorine dioxide and sodium hypochlorite, and washed to remove the remaining lignins. Bleaching solubilizes lignins, thus imparting a large amount of color to the bleaching solution. The bleaching solution is removed from the pulp before washing and is termed the "bleaching effluent." After the bleached pulp is washed, the wash solution is also removed from the pulp. The wash solution effluent is referred to as "brown stock washer effluent." Typically, the bleaching effluent and the brown stock washer effluent are passed into the waste effluent stream of the facility without going through the evaporators.

Due to the volatile nature of the process, there is the chance that a breach in the system may occur and thus there are also containment structures for receiving the pulp and/or pulping liquors in the various stages. The concentrated organic material in the strong black liquor causes serious problems when accidentally discharged to a waste treatment facility. Liquor losses negatively affect the waste treatment facility and are environmentally detrimental to the receiving body of water through toxic breakdown effects. When bleaching is performed at an integrated paper mill, the volume of highly colored, degraded lignin and wood sugars within a waste effluent is substantial. Thus, with both pulping liquors and bleaching effluents being highly colored, the amount of color in a discharged waste stream is viewed as indicative of the waste stream's toxicity.

Therefore, one focus of current environmental regulations is to regulate the pulping liquor content of the waste streams discharged into public systems and/or waterways by regulating the color of the effluent. For example, 40 C.F.R. §43 0.03 (i. e., the "Cluster" Rule) is particularly applicable to the pulp and paper industry. The color concentration of a liquid is generally referred to as the "true color" of the liquid and is typically measured in platinum cobalt (Pt/Co) units.

Numerous treatment schemes are known to those of skill in the art to reduce the color of the effluent. However, they tend to be inaccurate and in most cases do not address the real problem of true color. Existing methods include measuring fluid conductivity; Chemical Oxygen Demand (COD) and Total Organic Carbon (TOC). Experimental testing has revealed a lack of reliable correlation between conductivity, pH, COD, or TOC and color concentration. For example, conductivity is affected by regeneration of plant resin exchange units and the use of salt in the process. Further, the conductivity of bleach plant effluent is low compared to conductivity of strong black liquor due to the concentration of salts during evaporation. COD may be easily misinterpreted for several reasons. First, the various oxidants in the bleaching process severely affect color endpoint COD testing. Second, reproducibility of COD testing in a given environment with color endpoint testing methods is difficult. TOC as an indicator reveals only the entire organic content of an effluent. Because various effluents have significant carbon content, individual effluent impact is difficult to measure quantitatively.

Spectrophotometric techniques are considerably more accurate than the aforementioned methods for measuring the true color of pulp and paper mill effluents. In general, spectrophotometric techniques measure the true color of a filtered sample of the effluent. The true color is affected by a number of factors, but in the pulp and paper industry, true color tends to be most significantly affected by degraded lignin bodies, wood sugars and pulping liquor (i.e., sulfide). Although spectrophotometric techniques are useful, current practices require significant operator intervention and substantial amounts of time to measure the color of pulp and paper mill effluents.

Various methods, well known to those of skill in the art, have been used to reduce true color content of paper and pulp mill effluents. For example, some branched or linear epichlorohydrin dimethylamine condensation polymers are known to reduce color, which is indicative of toxic substances, in pulp and paper mill effluents. However, a common problem associated with these polymers is that they cannot lower the color of the effluent below a certain value beyond which the color resolubilizes. This is commonly referred to as "overfeeding", as further application of the polymer results in an increase in the color of the effluent above the earlier reached minimum value. A similar problem is observed when polydiallyldimethyl-ammoniumchlorides are used to reduce color content of effluents. Epichlorohydrin condensates in combination with dosages of inorganic salts, such as aluminum sulfate or ferrous sulfate, in the 300 to 1,000 ppm range also effect color reduction. However, this mixture produces a voluminous amount of sludge and requires the addition of caustic soda to maintain the pH of the effluent at required levels.

In view of the foregoing, it would be desirable to develop a chemistry for reducing color in paper and pulp mill effluents that reduces the true color of lignin containing effluents to low levels without producing large amounts of sludge or strongly affecting the pH of the effluent.

SUMMARY OF THE INVENTION

The present invention relates generally to chemical compositions and processes for reducing true color in waste liquids, such as paper and pulp mill effluents. The present invention reduces the true color of lignin containing effluents to low levels without producing large amounts of sludge or strongly affecting the pH of the effluent.

In one embodiment of the present invention, there is described a composition to reduce true color in a liquid effluent including aluminum chlorohydrate and a branched epichlorohydrin amine condensate polymer. In some embodiments, the branched epichlorohydrin amine condensate polymer may have an average molecular weight greater than 300,000, and may be branched with an amine such as ethylenediamine or hexamethylenediamine.

In another embodiment of the present invention, there is described a process for reducing true color in a liquid effluent in which aluminum chlorohydrate and a branched epichlorohydrin amine condensate polymer are applied to a liquid effluent. In some embodiments, the branched epichlorohydrin amine condensate polymer may have an average molecular weight greater than 300,000, and may be an epichlorohydrin dimethylamine condensate polymer branched with an amine such as ethylenediamine or hexamethylenediamine. In some embodiments, the branched epichlorohydrin amine condensate polymer may be applied to the effluent separately but concurrently with the aluminum chlorohydrate, while in other embodiments, it may be preblended with the aluminum chlorohydrate prior to application to the effluent.

BRIEF DESCRIPTION OF THE DRAWINGS

The present invention will be better understood by reference to the following description taken in conjunction with the accompanying drawings in which.

DETAILED DESCRIPTION OF THE INVENTION

Figure 1:
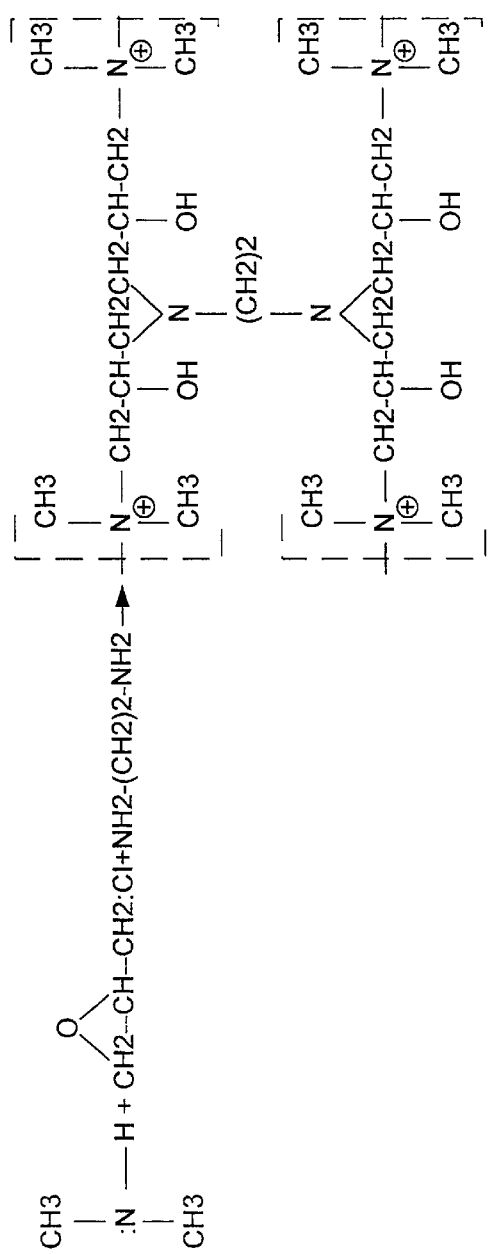
FIG. 1 is a general diagrammatic illustration of the polymerization of a branched epichlorohydrin dimethylamine ethylenediamine.

The present invention will now be more fully described with reference to the accompanying drawings. To facilitate explanation, the invention will be described primarily in the context of a particular embodiment for reducing the true color of a waste effluent stream, such as pulp and paper mill effluents. While the invention will be described in conjunction with this particular embodiment, it should be understood that many aspects of the invention are not limited to controlling the true color of pulp and paper mill effluents. To the contrary, the invention can be applied to a wide variety of applications and it is intended to cover alternatives, modifications, and equivalents as may be included within the spirit and scope of the invention as defined by the appended claims.

The present invention includes compositions and processes for reducing true color in a liquid, such as a waste effluent stream of a pulp or paper mill. The present invention will be described as primarily implemented in a system that automatically monitors in real time the true colors in a liquid. However, it will be appreciated that the present invention may be implemented in other systems using different techniques that measure the true color in a liquid.

According to one embodiment of the present invention, a composition of aluminum chlorohydrate and branched epichlorohydrin amine condensate polymers is used to reduce true color in a liquid waste water effluent. In one embodiment, the branched epichlorohydrin amine condensate polymer is a branched epichlorohydrin dimethylamine condensate polymer, however, other secondary alkyl amines may also be used. In one embodiment, the epichlorohydrin dimethylamine condensate polymer is branched with ethylenediamine, however, other branching agents, such as hexamethylenediamine may also be used. In general, any bifunctional or higher functional amine may be employed to impart branching. Tetrafunctional primary amines such as ethylenediamine and hexamethylenediamine are particularly preferred. Preferably, the branched epichlorohydrin dimethylamine condensate polymer has an average molecular weight greater than about 300,000 and more preferably an average molecular weight in the range between about 750,000 to about 1,000,000, with an average molecular weight of about 900,000 to about 1,000,000 being most preferred.

The combination of aluminum chlorohydrate and branched epichlorohydrin amine condensate polymers is non-hazardous and easy to use in the pulp and paper mill environment. When applied to a wastewater effluent containing lignins, the aluminum chlorohydrate and branched epichlorohydrin amine condensate polymers react with the lignins in a quantity large enough to form an insoluble floc mass or agglomerate. This agglomerate then sinks or floats for removal, for example, using filtration, thus permanently reducing the true color of the effluent. Significantly, the agglomerate formed using the present invention is insoluble and further, does not resolubilize over time, as was problematic with prior art methods and has minimal sludge formation. Further, the composition may be applied at ambient pH (i.e., a pH between about 7.0 to about 11.0), and thus, has minimal effect on the pH of the effluent.

In one embodiment, the aluminum chlorohydrate and branched epichlorohydrin amine condensate polymer may be a preblended composition that is about 50% by weight aluminum chlorohydrate and about 50% by weight branched epichlorohydrin amine condensate polymer. The preblended composition is then applied to an effluent as needed to achieve the required reduction in true color of the effluent.

In another embodiment, the aluminum chlorohydrate and branched epichlorohydrin amine condensate polymer may be a preblended composition that contains about 50% by weight of an approximately 50 weight/% active solution of aluminum chlorohydrate in water and about 50% by weight of an approximately 50 weight/% active solution of branched epichlorohydrin amine condensate polymer in water. The preblended composition is then applied to an effluent to reduce the true color. Alternatively, each of the active solutions may remain separate, and then be applied separately, but concurrently to the effluent to reduce the true color.

Generally, the ratio of branched epichlorohydrin amine condensate polymer to aluminum chlorohydrate in the final product may be in the range between about 4:1 to about 2:3, preferably about 3:2 to about 2:3, and more preferably about 1:1. Particularly effective dosages of the 1:1 ratio of components vary between about 10 ppm to about 120 ppm.

Epichlorohydrin amine condensate polymers may be formed from an epoxide reaction between the oxirane group of the epichlorohydrin, and an amine, such as secondary alkyl amine. For example, dimethylamine is a commercially available secondary alkyl amine. Oxiranes and amines have antagonistic functional sites such that the nucleophilic attack of the amine on the oxirane group opens the oxirane ring and polymerizes with the subsequent condensation or release of water. As this condensation reaction typically produces a linear polycondensate, a tetrafunctional primary amine, such as ethylenediamine, is used to form a branched polycondensate, such as a branched epichlorohydrin dimethylamine ethylenediamine condensate polymer.

FIG. 1 is a general diagrammatic illustration of the polymerization of a branched epichlorohydrin dimethylamine ethylenediamine. In one embodiment, between about 0.95:1 to 1:1 molar ratio of epichlorohydrin to dimethylamine may be used with a slight excess of epichlorohydrin being used to complete the reaction. Between about 1 to 5 mole percent (%) of a branching agent, such as ethylenediamine or hexamethylenediamine, is used to branch the reaction.

In the present embodiment, epichlorohydrin is used in forming the polymer due to its commercial availability; however, other epihalohydrins may be used, for example, epibromohydrin. In choosing other epihalohydrins, tie final polymer should remain soluble. Further, in the present embodiment, dimethylamine is used as the ring opening compound in the polymerization also due to its commercial availability; however, other ring opening amine compounds, such as secondary alkyl amines, may be used. Additionally, in the present embodiment, ethylenediamine is used to branch the polycondensate due in part to current FDA clearances in food use; however, other multifunctional amines, particularly tetra-functional primary amines, such as hexamethylenediamine, may also be used.

When choosing the amine or branching agents, care must be used to avoid amines with bulky hydrophobic constituents. The more substituted the amine or diamine is with hydrophobic groups, the less water soluble the resulting polycondensate. Ethylenediamine or hexamethylenediamine are preferred branching agents because of the low degree of hydrophobic substitution. However, as the efficiency of color removal from the effluent generally increases with increasing molecular weight of the branched epichlorohydrin amine condensate polymers, the branched epichlorohydrin amine condensate polymer should have a large average molecular weight.

Figure 2:
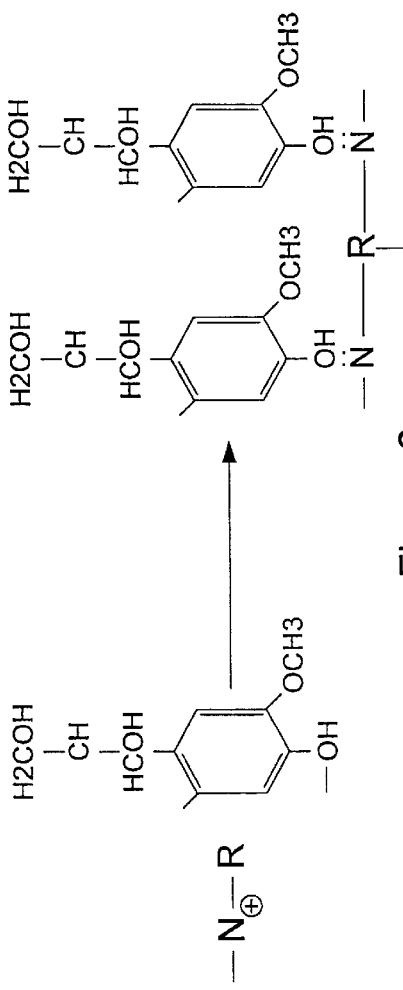
FIG. 2 is a general diagrammatic illustration of the reaction of a branched epichlorohydrin amine condensate polymer with a lignin.

FIG. 2 is a general diagrammatic illustration of the reaction of a branched epichlorohydrin amine condensate polymer with a lignin. The "R" group of FIG. 2 denotes the branching components of the polymer. In one embodiment, the branched epichlorohydrin amine condensate polymer may have an average molecular weight greater than 300,000, and preferably between about 750,000 to about 1,000,000, and more preferably about 1,000,000. For example, epichlorohydrin dimethylamine may be branched with ethylenediamine or hexamethylene-diamine and condensed to near gel point to produce a polymer with an average molecular weight of about 1,000,000, which provides effective color reduction, e.g., effective true color reduction in waste effluents. Although gel point is a term well known to those of skill in the art, gel point may be generally viewed as the point at which polymerization proceeds that, beyond it, solubility of the reactants is irreversibly lost. Lower molecular weight ammonia branched epichlorohydrin amine condensate polymers typically provide inferior results.

As earlier described, application of the present invention to the waste water effluent containing lignins results in an insoluble floc mass, or agglomerate that can be easily removed from the effluent, thus reducing the true color of the effluent. And, further, the agglomerate does not resolubilize over time. Typically, as seen in the prior art, the ammonium linkages are subject to hydrolysis and decomposition allowing the color (lignin) to become unbound and redissolve in the water. However, the use of the aluminum chlorohydrate concurrent with the branched epichlorohydrin amine condensate polymers of the present invention results in the formation of an $Al(OH)_3$-branched epichlorohydrin amine condensate polymer-lignin complex in a quantity large enough to become insoluble and is resistant to further hydrolysis. Thus, the color does not resolubilize over time.

While the exact mechanism is not known, the aluminum chlorohydrate may act as an adsorbing agent for the condensate polymer/lignin complex. When applied to the waste water effluent, the aluminum chlorohydrate may hydrolyze to aluminum hydroxide forming a large, insoluble particulate with a large surface area. Concurrently, the branched epichlorohydrin amine condensate polymer may bind to the hydroxyl or methydroxyl groups of the lignin to create an insoluble complex. This complex may then be adsorbed into the hydrolyzed aluminum hydroxide and become bound forming the insoluble agglomerate and removing the color from the effluent without resolubilizing.

EXAMPLES

The following examples describe specific aspects of the present invention to illustrate the invention and aid those of skill in the art in understanding and practicing the invention. The examples should not be construed as limiting the present invention in any manner.

Example 1

The following experiments were performed to test a 1:1 mixture of epichlorohydrin amine condensate to aluminum chlorohydrate utilizing 930 ml of bleach plant effluent and 70 ml of 60% black liquor (bleached Kraft mill).
Initial color: 1,500 Pt/Co units

| Dose (ppm) | Color (Pt/Co units) |
|---|---|
| 10 | 1,350 |
| 20 | 1,300 |
| 30 | 1,275 |
| 40 | 1,100 |
| 50 | 900 |
| 60 | 820 |
| 70 | 750 |
| 80 | 675 |
| 90 | 610 |
| 100 | 460 |
| 120 | 395 |

This example illustrates the effectiveness of the mixture in reducing color of pulp mill effluent. The color reduction generally increases as a function of increasing dosage.

Example 2

Plant trial; 900 tons per day bleached Kraft mill.
Flow=14,000,000 gallons per day
True color=1,450 Pt/Co units.
Dose=100 ppm of a 1:1 mixture of epichlorohydrin amine condensate to aluminum chlorohydrate.
Primary clarifier effluent color=450 Pt/Co units 24 hr. aeration, followed by secondary clarification, True color= 250 Pt/Co units This example demonstrates that the chemicals and processes of the present invention can be scaled up to function efficiently in pulp and paper mills.

Thus, there have been described several embodiments of compositions and processes for reducing true color in a liquid effluent, such as a pulp or paper mill effluent containing lignins. It will be appreciated that the present invention may be used in reducing the true color of many types of effluents used or produced during the pulping or paper milling process. For example, the present invention may be applied to reduce the true color of Kraft pulping effluents; bleach plant effluents; recovery boiler effluents; evaporator effluents; multiple effect evaporator effluents; black liquor effluents; brown stock washer effluents; digester effluents; and, the combined effluent streams of the Kraft pulping process and the paper making process. Further, the present invention may be implemented with manual, semi-automatic or automatic systems for reducing true color.

In one embodiment, the present invention may be implemented in a system that provides automatic real time monitoring of true color in waste liquids. Such a system is described in commonly assigned U.S. patent application Ser. No. 09/501,346, filed Feb. 9, 2000, entitled "Automatic Real Time Monitoring of True Color in Waste Liquids," by Stephen R. Temple and Michael J. Stoltz, which is hereby incorporated by reference.

Figure 3:
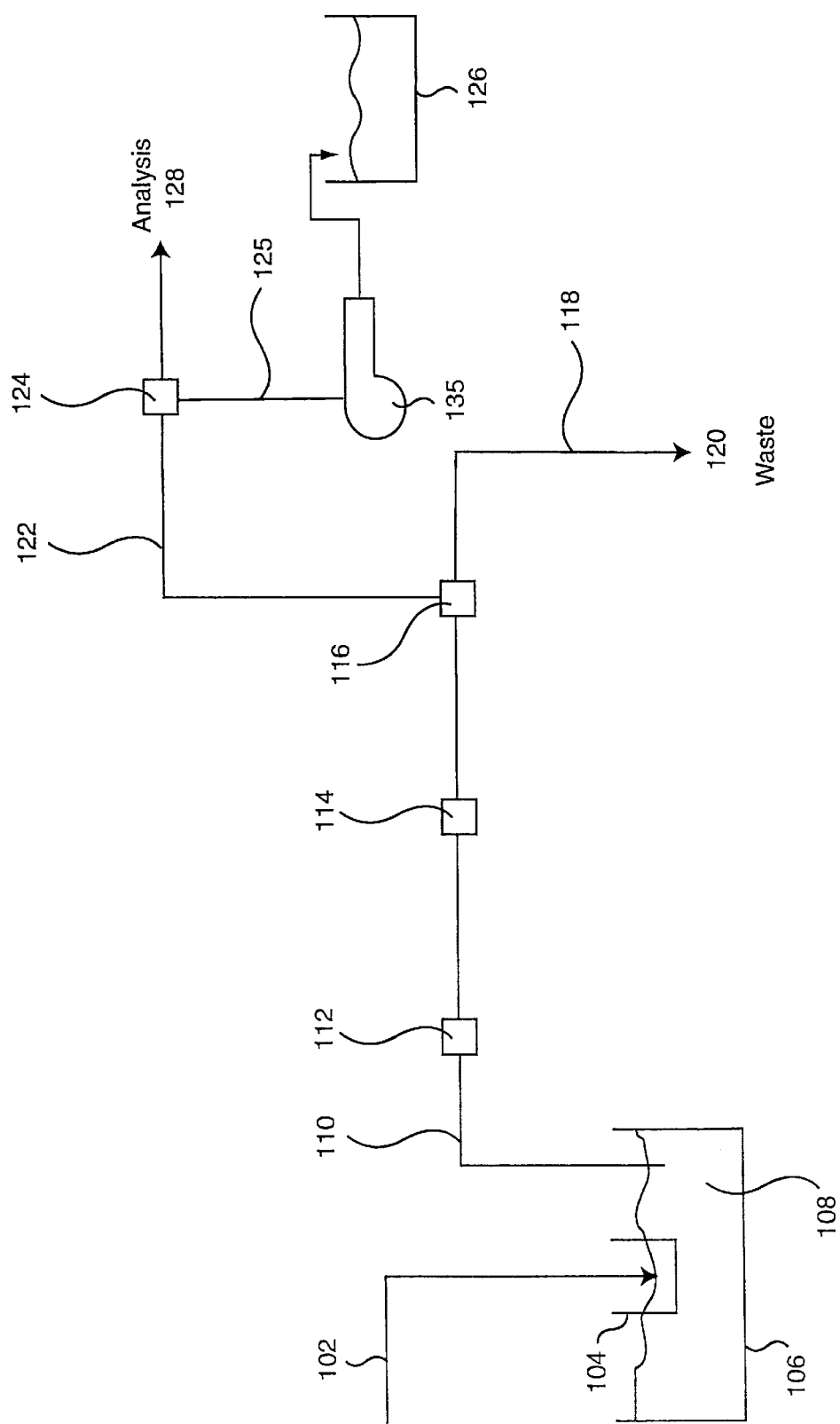
FIG. 3 illustrates automatically processing a sample from a liquid in real time for subsequent analysis.

FIG. 3 illustrates a representative system for automatically processing a liquid sample for subsequent real time analysis and control. Referring now to the left side of FIG. 3, effluent 102 is added to primary clarifier 106 that is filled with waste liquid 108. The effluent may be, for example, from a pulp mill, paper mill, a bleach plant, a waste water treatment facility or a pre-treatment facility or any combination of the foregoing, including effluents earlier described. In other embodiments, the liquid may be a receiving body of water at a waste treatment facility or a pre-treatment facility. In the paper mill example, the effluent 102 may be added to the center well 104 of a primary clarifier 106 that is filled with pulp waste (e.g., pulping liquors) having varying concentrations. A significant goal of primary clarification is to reduce the Biological Oxygen Demand (BOD), Chemical Oxygen Demand (COD) and total suspended solids from the waste stream by removing (settling) the organic materials. The size of the clarification plants may be widely varied based on the needs of a particular treatment plant. As will be appreciated by those skilled in the art, in some pulping applications, primary clarifiers such as 106 are capable of holding millions of gallons of waste 108.

In the embodiment shown, sample stream 110 is automatically withdrawn by pump 112 from waste 108 located in clarifier 106 in real time. Pump 112 and other associated downstream equipment are typically located above clarifier 106, although this is not a requirement. Pumps may be positioned to withdraw a sample from any location in the effluent line or waste stream of a pulp mill, paper mill, bleach plant, waste water facility or pre-treatment facility. In other embodiments, the pump may be positioned to withdraw a sample from a receiving body of water at a waste treatment facility or a pre-treatment facility. Thus, the placement of the pump in the exemplified embodiment is illustrative rather than restrictive.

The pump may be any suitable pump. By way of example, peristaltic or diaphragm pumps are particularly suited for this application. In one particular embodiment, the pump automatically withdraws sample stream 110 in real time from waste 108 at a rate of between about 6 gallons per minute and about 8 gallons per minute. However, those of skill in the art will recognize that a sample can be withdrawn from a waste stream or a plant effluent at widely varying rates.

Sample 110 may be pumped through a pH loop 114 where the pH of stream 110 may be measured and adjusted in real time, if necessary. For example, sample stream 110 may require a pH adjustment to pH 7.6 if direct true color measurements are required ("Standard Methods for the Examination of Water and Waste Water", Environmental Protection Agency). Note that in the exemplified embodiment, pH adjustment is performed prior to filtration of sample stream 110. However, although performing these operations in the order illustrated is preferred, it is not strictly necessary, as sample stream 110 may be filtered prior to pH adjustment.

Figure 4:
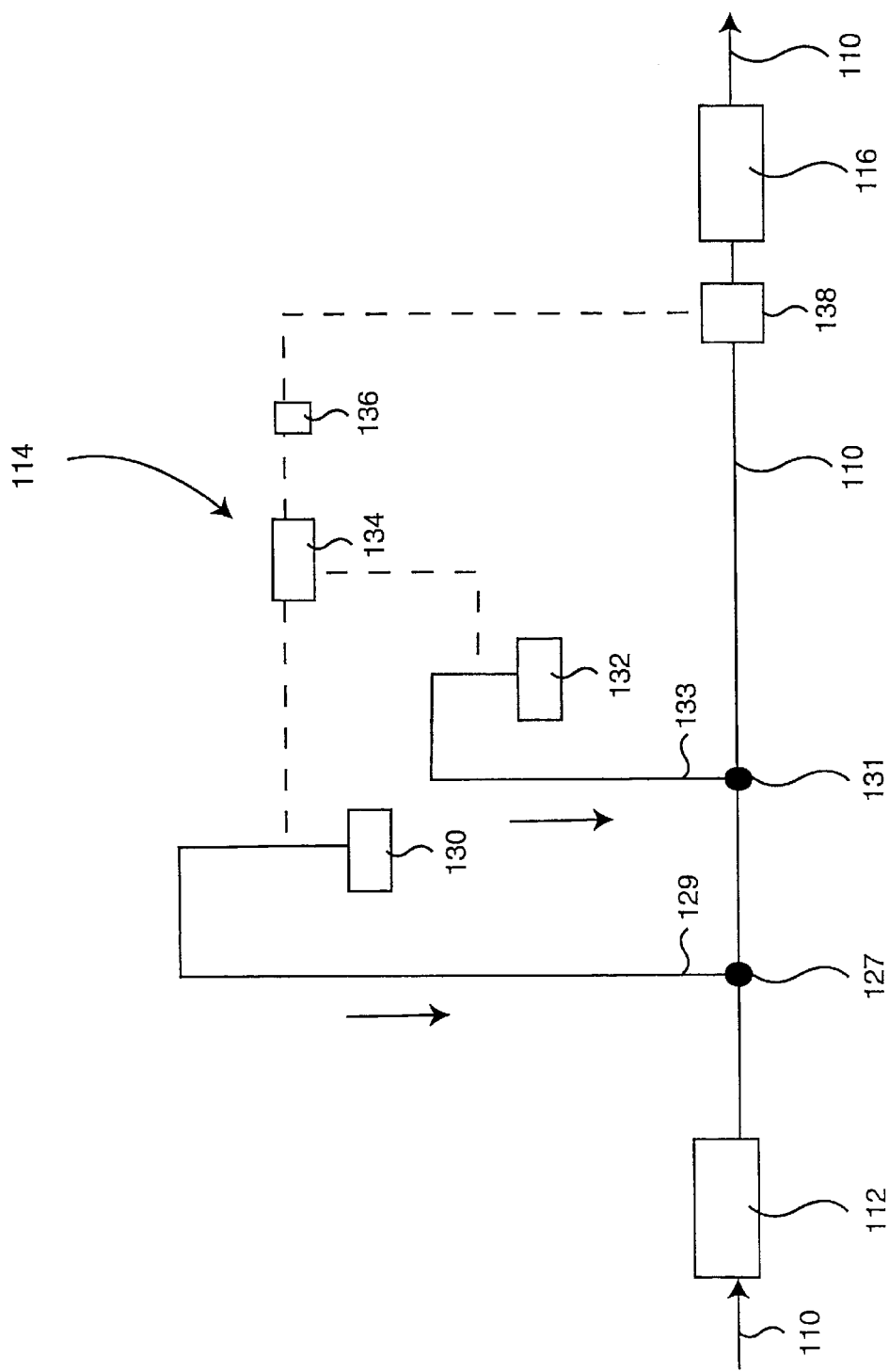
FIG. 4 illustrates an apparatus for automatically determining and adjusting the pH of the sample.

FIG. 4 illustrates one embodiment of a pH loop that may be used in practicing the current invention. Referring to FIG. 4, sample stream 110 passes through pump 112 and continues to filter device 116. Located before filter 116 is a pH probe 138. Probe 138 is connected to pH transmitter 136, which determines the pH of stream 110 and communicates this information to a controller 134. Controller 134 may take any suitable form. By way of example, the controller 134 may take the form of a simple on/off controller, a Proportional Integral Derivative (PID) stand alone controller, a Programmable Logic Device (PLC) that utilizes (PID) control, fuzzy logic or another type of control algorithm or a personal computer. Controller 134, by opening and closing valves 127 and 131, which are connected by lines 129 and 133 to acid reservoir 130 and base reservoir 132, respectively, is able to automatically adjust the pH of sample stream 110 in real time. Alternatively, the controller 134 may use other appropriate flow control mechanisms, such as proportionally ramping the pump flow rate up or down.

Many applications do not require any adjustment or measurement of the pH of sample stream 110. In these situations, the present invention may be practiced without pH loop 114, and sample stream 110 may proceed directly to filter 116.

Sample stream 110 must be filtered through an appropriate filter if direct true color measurements are required ("Standard Methods for the Examination of Water and Waste Water", Environmental Protection Agency). More specifically, the current standards require filtration through a 0.8 μm or smaller filter. Of course, the appropriate filter size may vary with the needs of a particular design and/or with changes in the standards. Filtration removes turbid insoluble colloidal materials such as pulp, clay, dispersants, surface active agents, polymers and lime that may significantly affect subsequent analysis of true color content in sample stream 110. For example, these particulate materials can influence true color, generate inaccurate apparent color visible to the naked eye and clog downstream analytical equipment. Any durable filtering system may be used to filter sample stream 110.

Any suitable filtering system 116 may be used to automatically filter the sample stream 110 in real time. In a pilot run of the described invention, a filter system purchased from Collins Product and described in Collins, U.S. Pat. No. 4,693,815 (which is incorporated herein by reference) was used. The Collins filter was found to be particularly useful since it is self-cleaning. Of course, a wide variety of other filtering systems may be used in its place. Other representative filtering systems are described in Holland et al., U.S. Pat. No. 4,112,768, Miller et al., U.S. Pat. No. 5,578,213, Allsing, U.S. Pat. No. 4,956,102 and Roichigo, U.S. Pat. No. 5,143,630. All of the aforementioned patents are incorporated herein by reference. Filters that produce a shear at the filter membrane/fluid interface have been found to work quite well. It is believed that the shear at the filter membrane reduces migration of particulate into the filter membrane, thereby reducing plugging of the filter, which permits less frequent replacement of the filter membranes.

Figure 5:
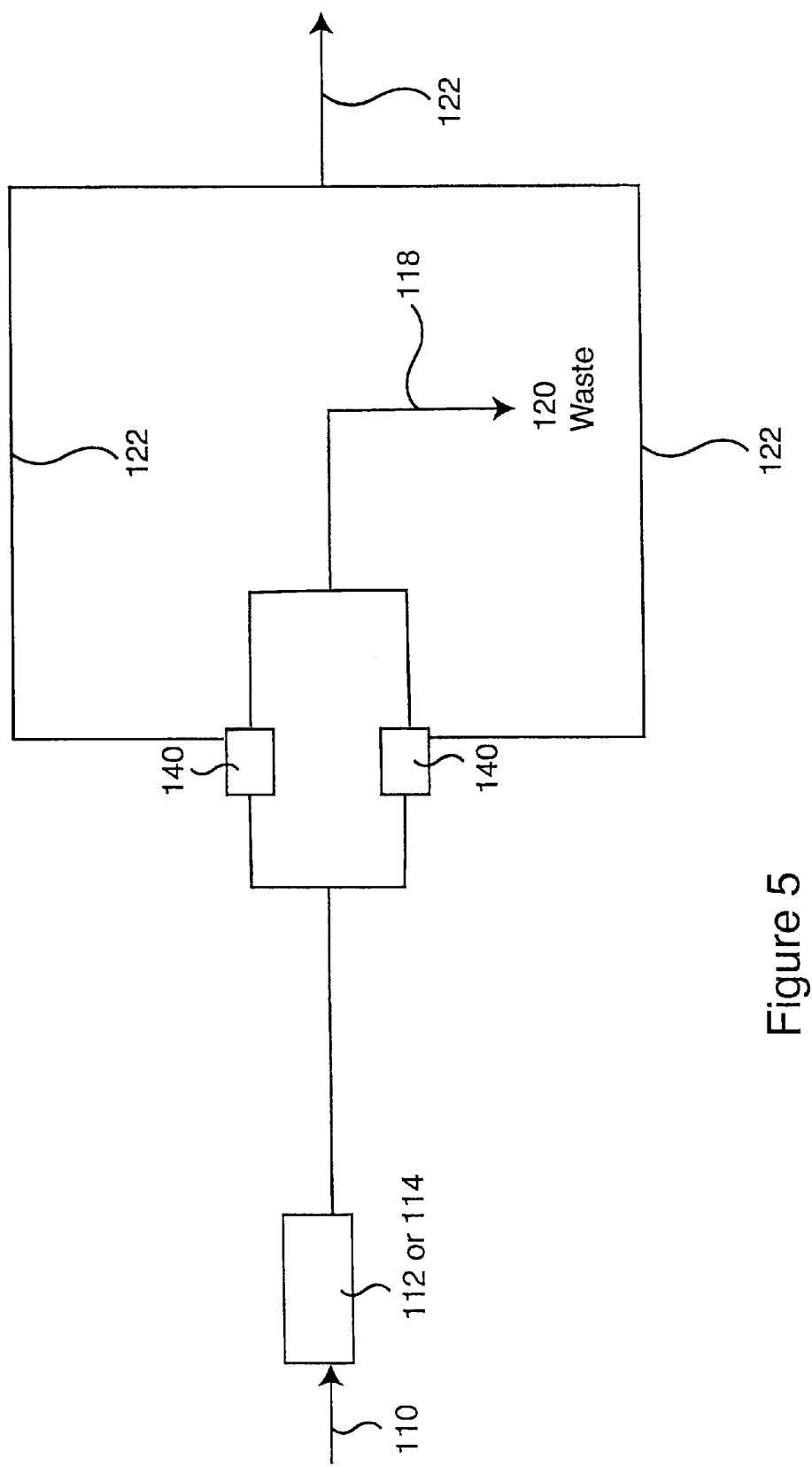
FIG. 5 illustrates a filter system for filtering the sample to allow subsequent monitoring of the true color content of the sample.

Referring again to FIG. 5, sample stream 110, after passing past either pump 112 or pH loop 114, enters the automatic self-cleaning filtration apparatus 116 (as for example described in Collins, U.S. Pat. No. 4,693,815). As shown in FIG. 5, filtration apparatus 116 contains two filter units 140. The filters 140 contain a Teflon filter membrane with a pore size less than or equal to about 0.8 μm with a magnetically coupled propeller which spins at between about 3,000 rpm and about 3,400 rpm that creates shear that prevents particulates from embedding in the filter. Thus, filtration apparatus 116 can be automatically and continuously used to filter sample stream 110 in real time for several weeks without requiring maintenance or replacement and offers significant cost savings over comparable devices.

In the described embodiment, a major portion of sample stream 110 passes directly through the filtration apparatus 116 without any filtration to provide crude sample stream 118 which is then collected in waste reservoir 120. Waste reservoir 120 may be connected with clarifier 106 in FIG. 1. For example, when the flow rate of sample stream 110 is between about 6 gallons per minute and about 8 gallons per minute, between about 50 mls per minute to about 100 mls per minute of sample stream 110 are filtered through filters 140. Those of skill in the art will recognize that the rate of sample filtration may be widely varied.

Referring again to FIG. 3, a dilute solution of bleach may be periodically introduced from a bleaching reservoir 126 into biologically rich sample stream 122. The bleach prevents micro-organism growth in analysis equipment 128. In one embodiment, bleach may be introduced into filtered sample stream 122 about every two to six hours. The bleach may be introduced using any suitable pump, injecting mechanism or arrangement. In one embodiment, a perastolic pump is used because such pumps work as a check valve. Other biocides or methods, such as organic biocides, UV irradiation, or ultrasonic cleaning, well known to those of skill in the art, may also be used in place of bleach to prevent micro-organism growth in the analysis equipment 128. Any time a cleaning mechanism (such as bleach) that can affect the color content of the sample stream is used, it is desirable to periodically clean, as opposed to continuously clean, to reduce skewing of the detected color levels. In the embodiment shown, a valve 124 is used to connect bleach feed line 125 to the sample stream 122. Of course, such a connection can be made using a variety of alternative structures including check valves or simple T connectors.

Figure 6:
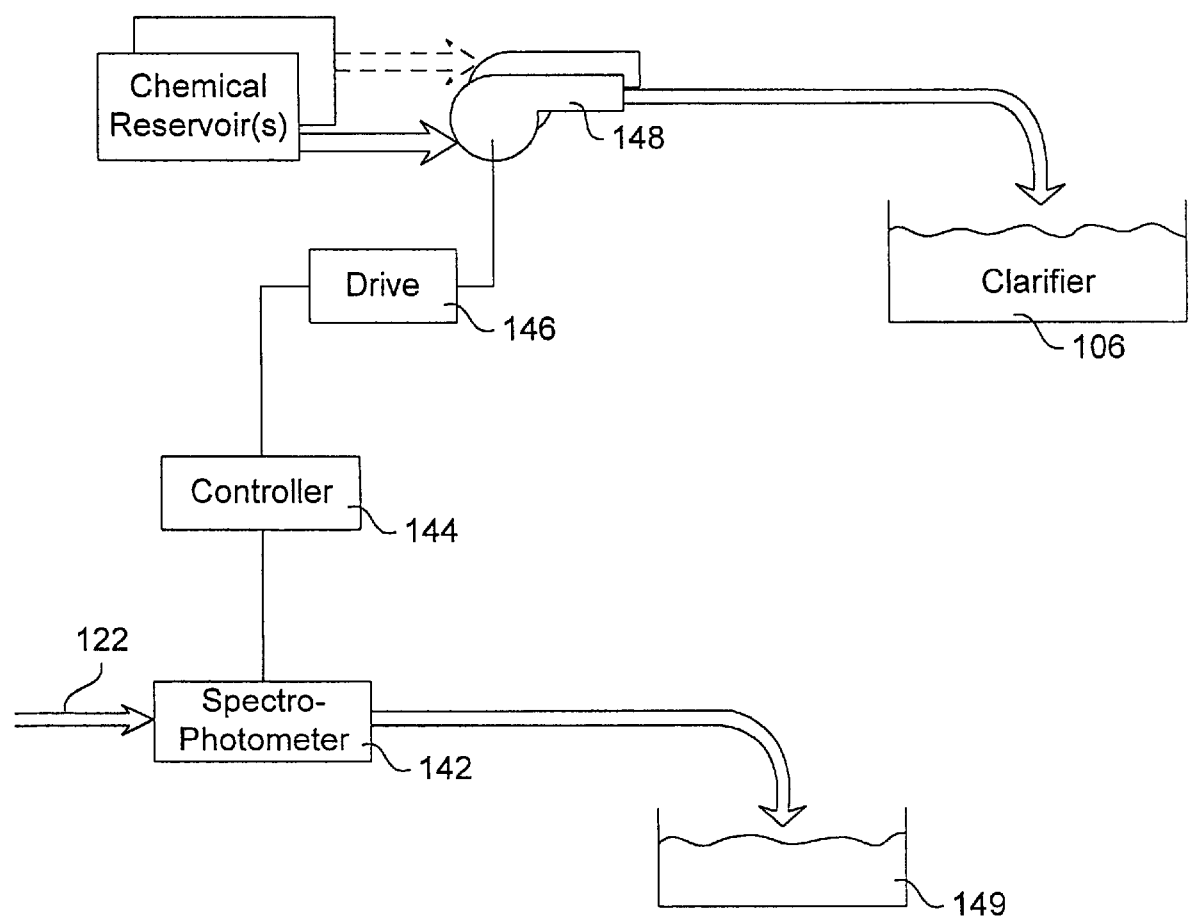
FIG. 6 illustrates automatically monitoring true color content in the sample in real time and feed forward control of the effluent.

Referring now to FIG. 6, the filtered sample stream 122 flows past (or through) an absorption spectrophotometer 142, which automatically monitors the true color of the filtered sample stream 122 in real time. The absorption spectrophotometer 142 may be any suitable on line, in-situ absorption spectrophotometer. At the time of this writing, the recognized standard for use with 10 nm or less spectral bands is a 10 mm absorption cell. However, it should be readily apparent that both the spectral bands and the absorption cell dimensions can be widely varied. By way of example, a Model 5420 photometric analyzer available from Custom Sensors & Technology may be used.

Typically, the on line in-situ absorption spectrophotometer 142 is used to automatically detect true colors in sample stream 122 in an accurate, non-destructive manner that obviates the need for the introduction of chemical reagents that may be required by other methods of detecting color either directly or indirectly. As indicated above, a wide variety of spectral bands may be appropriate to detect color. By way of example, in a preferred embodiment, spectrophotometer 142 uses a wavelength between about 400 and 800 nm with a 10 nm or less spectral band to detect the true color of sample stream 122. In a preferred embodiment, wavelengths in the range of about 430 to 460 nm are used. In the described embodiment, wavelengths in the range of 450 to 460 nm, for example 455 nm, are used since as of the time of this writing, 455 nm is the recognized standard for detecting "true" color. It should be appreciated that the described filtering of the sample stream 110 prior to the spectrophotometry does not degrade the true color measurement. Sample stream 122 may be passed to waste 148 (or any other suitable location) after absorption measurement by spectrophotometer 142.

In alternative embodiments, multiple wavelength spectrophotometers or other suitable spectrophotometers may be used. When a multiple wavelength photospectrometer is used, sampling wavelengths in the range of 300 to 1,100 nm would be appropriate and appropriate correlation would be required.

Generally, a quantitative correlation can be made between the color detected by automated absorption spectroscopy and the chemistry of the source of the sample stream. Using the pulp and paper mill example illustrated in FIG. 3, the color of the sample will relate significantly to the concentration of pulping liquor within the clarifier 106 (which is the source of the sample stream 122). Similarly, in many situations, a quantitative correlation may be made between the detected true color and the degraded lignin content as color bodies of the sample stream 122. This correlation can be used to facilitate real-time control of the clarifier chemistry (or other treatment process) itself. By controlling the treatment process, the color of liquids discharged from the clarifier can be effectively controlled in real time.

More specifically, an appropriate controller 144 can be used to control the addition of chemicals to the source of the sample stream. In the pulp mill example, the controller 144 can be used to control one or more pumps 148 that control the addition of aluminum chlorohydrate and the branched epichlorohydrin dimethylamine condensate polymer, such as branched epichlorohydrin dimethylamine ethylenediamine, to the clarifier 106. By controlling the addition of the aluminum chlorohydrate and the branched epichlorohydrin dimethylamine condensate polymer, the color of effluents discharged from the plant can be effectively controlled. As earlier noted, the pump(s) 148 dispensing the branched epichlorohydrin dimethylamine condensate polymer should be robust due to the density of the polymer.

In one embodiment, the aluminum chlorohydrate and branched epichlorohydrin dimethlyamine ethylenediamine condensate polymer may be provided as a preblended composition that contains about 50% by weight aluminum chlorohydrate and about 50% by weight branched epichlorohydrin dimethylamine condensate polymer. Preblending may be accomplished by simply mixing the products together under moderate agitation at the mill facility and then dispensed into the effluent, or the composition may be mixed at a separate facility and then shipped to the mill as an end user and then dispensed into the effluent. In one example, the pump(s) 148 may apply the preblended composition to the effluent in the clarifier 106.

In another embodiment, the aluminum chlorohydrate and branched epichlorohydrin dimethylamine ethylenediamine condensate polymer may be provided as a preblended composition that contains about 50% by weight of an approximately 50 weight/% active solution of aluminum chlorohydrate in water and about 50% by weight of an approximately weight/% active solution of branched epichlorohydrin dimethylamine condensate polymer in water. The pump(s) 148 may apply the preblended composition to the effluent in the clarifier 106. Alternatively, the active solutions may remain separate and then be applied separately but concurrently to the effluent in the clarifier 106 by the pumps 148.

A wide variety of controllers and control algorithms can be used to control the addition of the aluminum chlorohydrate and the branched epichlorohydrin dimethylamine condensate polymer to the clarifier 106. By way of example, in the control system illustrated in FIG. 6, the spectrophotometer 142 provides a signal (which may be either a digital or an analog signal) that is indicative of the detected color of the filtered sample stream. The spectrophotometer output is passed to a controller 144 which may take any suitable form including a processor, a programmable logic device, a computer, dedicated controller logic, etc. The controller 144 correlates the signal received from the spectrophotometer (e.g., the detected color) to any needed additions of aluminum chlorohydrate and/or branched epichlorohydrin dimethylamine condensate polymer to the clarifier 106.

As will be apparent to those skilled in the art, the correlation between the detected color and the amount and types of chemicals to be added to the clarifier can be made in a variety of ways. By way of example, in a relatively simple controller, a simple lookup table can be used. That is, a lookup table can be provided that effectively identifies the amount of a particular chemical that should be added to the clarifier based on the detected true color. In one implementation that contemplates continuous addition of chemicals to the clarifier, the lookup table identifies the appropriate magnitude of a signal that is provided to a frequency drive 146 that controls the speed of a chemical pump 148. In other embodiments, the lookup table may identify other appropriate values, such as the amount of chemical to be added or the length of time that the chemical pump should be run. Of course, as will be readily apparent to those skilled in the art, a wide variety of other controller structures and control algorithms can be used based on the needs of a particular plant. In some systems, there may be a number of chemicals to be added and the control algorithm may be based on several different inputs wherein the spectrophotometer input is just one of the inputs. By way of example, other inputs that may be desirable for control of a particular system may include any of pH, conductivity, clarifier volume, flow, etc.

The addition of the aluminum chlorohydrate and the branched epichlorohydrin dimethylamine condensate polymer reacts with the lignins in the clarifier 106 to form agglomerates and remove color from the effluent, thus reducing the true color of the effluent. These agglomerates may then be removed from the effluent. In one example, the agglomerates may be removed from the clarifier 106 by filtering. The resulting effluent may then be dispensed from the clarifier 106 to other waste facilities or streams.

Thus, there have been described various embodiments of compositions and processes of the present invention for reducing true color in waste liquids. The present invention reduces the color of lignin-containing effluents to low levels without producing large amounts of sludge or strongly affecting the pH of the effluent.

Although the foregoing invention has been described in some detail to facilitate understanding, it will be apparent that certain changes and modifications may be practiced within the scope of the appended claims. For example, within the system providing automatic real time monitoring of true color in waste liquids, a sample could be withdrawn at different locations in a pulp or paper mill plant or multiple samples could be withdrawn from multiple locations for subsequent analysis. Accordingly, the described embodiment is to be considered as illustrative and not restrictive, and the invention is not to be limited to the details given herein, but may be modified within the scope and equivalents of the appended claims.

We claim:

1. A composition used to reduce true color in pulp and paper mill effluents containing lignins comprising:

aluminum chlorohydrate, and a branched epichlorohydrin amine condensate polymer, said branched epichlorohydrin amine condensate polymer having an average molecular weight greater than 300,000, said composition containing an effective amount of aluminum chlorohydrate and branched epichlorohydrin amine condensate polymer to react with said lignins an form an insoluble floc mass that does not resolubilize over time.

2. The composition of claim 1 wherein said branched epichlorohydrin amine condensate polymer has an average molecular weight in the range between about 750,000 to 1,000,000.

3. The composition of claim 1 wherein said branched epichlorohydrin amine condensate polymer has an average molecular weight in the range between about 900,000 to 1,000,000.

4. The composition of claim 1 wherein said branched epichlorohydrin amine condensate polymer is a branched epichlorohydrin dimethylamine condensate polymer.

5. The composition of claim 4 wherein said branched epichlorohydrin dimethylamine condensate polymer is branched with an amine selected from the group consisting of ethylenediamine and hexamethylenediamine.

6. The composition of claim 5 wherein the aluminum chlorohydrate and branched epichlorohydrin dimethylamine condensate polymer are present in about equal concentrations by weight in the composition.

7. The composition of claim 6 wherein said aluminum chlorohydrate and said branched epichlorohydrin dimethylamine condensate polymer are preblended.

8. The composition of claim 5 comprising:
about 50% by weight of a 50 weight/% active solution of aluminum chlorohydrate in water; and, about 50% by weight of a 50 weight/% active solution of branched epichlorohydrin dimethylamine condensate polymer in water.

9. The composition of claim 8 wherein said solution of aluminum chlorohydrate and said solution of branched epichlorohydrin dimethylamine condensate polymer are preblended.

10. The composition of claim 5 wherein said branched epichlorohydrin dimethylamine condensate polymer is branched and polymerized to near gel point and has an average molecular weight of between about 900,000 to 1,000,000.

11. A composition used to reduce true color in pulp and paper mill effluents containing lignins consisting essentially of:
aluminum chlorohydrate, and
a branched epihalohydrin amine condensate polymer, said branched epihalohydrin amine condensate polymer being polymerized to near gel point and has an average molecular weight of between about 900,000 to 1,000,000, said composition containing an effective amount of aluminum chlorohydrate and branched epichlorohydrin amine condensate polymer to react with said lignins and form an insoluble floc mass that does not resolubilize over time.

* * * * *